United States Patent

Sowig et al.

Patent Number: 5,173,768
Date of Patent: Dec. 22, 1992

[54] ADAPTIVE PAL - OR NTSC - COMB FILTER

[75] Inventors: Helmut Sowig, Villingen-Schwenningen; Michael Zahm, Villingen, both of Fed. Rep. of Germany

[73] Assignee: Deutsche Thomson-Brandt GmbH, Fed. Rep. of Germany

[21] Appl. No.: 678,357

[22] PCT Filed: Oct. 11, 1989

[86] PCT No.: PCT/EP89/01198
§ 371 Date: Apr. 19, 1991
§ 102(e) Date: Apr. 19, 1991

[87] PCT Pub. No.: WO90/04906
PCT Pub. Date: May 3, 1990

[30] Foreign Application Priority Data

Oct. 20, 1988 [DE] Fed. Rep. of Germany ....... 3836043

[51] Int. Cl.$^5$ ............................................. H04N 9/78
[52] U.S. Cl. ................................................... 358/31
[58] Field of Search .................................... 358/31

[56] References Cited

U.S. PATENT DOCUMENTS

| | | | |
|---|---|---|---|
| 4,050,084 | 9/1977 | Rossi | 358/31 |
| 4,240,105 | 12/1980 | Faroudja | 358/31 |
| 4,636,840 | 1/1987 | McNeely et al. | 358/31 |
| 4,688,080 | 8/1987 | Wagner | 358/31 |
| 5,047,841 | 9/1991 | Robinson | 358/31 |
| 5,122,867 | 6/1992 | Hagino | 358/31 |
| 5,134,467 | 7/1992 | Kim | 358/31 |

FOREIGN PATENT DOCUMENTS

| | | |
|---|---|---|
| 113287 | 5/1975 | Fed. Rep. of Germany . |
| 2911927 | 6/1980 | Fed. Rep. of Germany . |
| 2169772A | 7/1986 | Fed. Rep. of Germany . |
| 0150688 | 11/1980 | Japan ................... 358/31 |
| 0186095 | 8/1986 | Japan ................... 358/31 |

Primary Examiner—James J. Groody
Assistant Examiner—Jeffrey S. Murrell
Attorney, Agent, or Firm—Joseph S. Tripoli; Eric P. Herrmann; Ronald H. Kurdyla

[57] ABSTRACT

A system for adaptively separating luminance and chrominance components of a color television signal includes a chrominance comb filter comprising a delay network with dual delay elements for providing a combed chrominance component, a bandpass filter for providing a bandpassed chrominance component, and a subtraction circuit. The subtraction circuit subtracts either the combed chrominance component or the bandpassed chrominance component from the television signal to produce a separated luminance component as a function of the phase of signals obtained from the delay network. Illustratively, the subtracter subtracts the bandpassed chrominance component from the television signal in the presence of color transitions in the vertical direction, and in the presence of 180° color transitions.

11 Claims, 4 Drawing Sheets

ADAPTIVE PAL - OR NISC - COMB FILTER

This invention concerns comb filter apparatus for adaptively separating the luminance and chrominance components of a composite color television signal.

BACKGROUND OF THE INVENTION

In color television systems according to PAL or NTSC standards, a chrominance component in the form of a quadrature modulated color subcarrier, a luminance component, a blanking component and a synchronizing component are transmitted as a composite television signal. The luminance and chrominance components are frequency interleaved. At a receiver, the luminance and chrominance components are separated before being further processed prior to being applied to image reproduction apparatus. Such separation is also necessary in a video recorder system where the chrominance signal is subjected to special processing as is known.

It is known to pass the signal through a band pass filter to a line delay, and to produce a comb filtered chrominance signal by combining the signals from input and output of the line delay. A separated luminance component is provided by subtracting the comb filtered chrominance signal from the composite television signal. Such a comb filter produces an averaging over several image lines because signals of successive lines are combined. Thus, for example, in a signal with high frequency signal jumps (i.e., rapid transitions) or color transitions in the vertical direction, the comb filtered output signal may exhibit unwanted signal disturbances and artifacts. That is, the unwanted artifacts may appear in the comb filtered output signal when successive image lines contain different (uncorrelated) information such as produced by a color (phase) change or a rapid (amplitude) transition of a high frequency signal. This effect is indicated by the following table which illustrates the disturbed condition of several image lines after comb filtering.

| line | direct signal | after comb filter | |
|------|---------------|-------------------|---|
| 1 | | | |
| 2 | ........ | .-.-.-.-.-.- | (disturbed) |
| 3 | ........ | .-.-.-.-.-.- | (disturbed) |
| 4 | ........ | ........ | |
| 5 | ........ | ........ | |
| 6 | ———— | .-.-.-.-.-.- | (disturbed) |
| 7 | ———— | ———— | (disturbed) |
| 8 | ———— | ———— | |

Certain improved transmission systems such as S-VHS video recorders and high definition television systems require a comb filter compatible with increased demands of such systems.

It is an object of the invention to develop a comb filter of the type described wherein signal disturbances and artifacts are significantly reduced or avoided while maintaining good signal separation.

SUMMARY OF THE INVENTION

In an illustrated preferred embodiment according to the principles of the invention, when conditions likely to cause the described disturbances or artifacts are present within an image structure of an input video signal, a subtraction stage which develops a separated luminance signal receives either a band pass filtered (non-comb filtered) chrominance signal or, in a PAL system under certain conditions, no chrominance signal instead of a comb filtered chrominance signal. The decision as to which of the signals is received by the subtraction stage is made by a switching circuit the operation of which is determined by prescribed parameters of the input signal. A control signal for the switching circuit is developed by a phase comparator network which responds to signals provided by a chrominance comb filter network including plural 1H delay circuits for developing 1H and 2H delayed output signals.

DETAILED DESCRIPTION

Figure 1A:
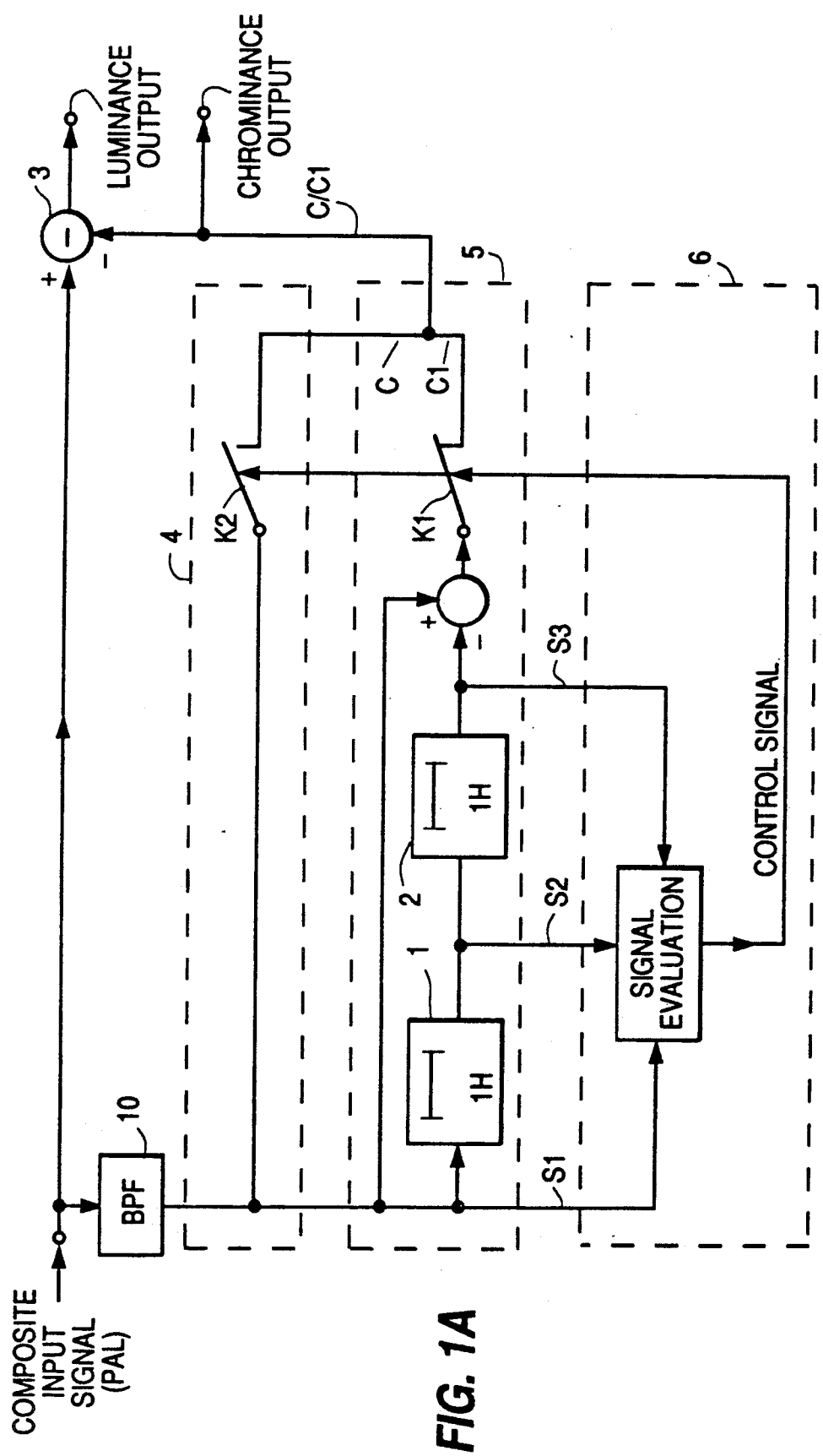
FIG. 1A is a block diagram of an adaptive comb filter according to the present invention for processing a television signal according to PAL standards.

In the adaptive comb filter of FIG. 1A, an input PAL-type composite color television signal containing luminance and chrominance components is applied to a non-inverting input (+) of a subtraction stage 3, and, via a chrominance band pass filter 10 to a selection circuit including units 4, 5 and 6. The selection circuit responds to predetermined criteria to determine which of two chrominance signals C1 (a two line comb filtered chrominance signal) or C (a band pass filtered chrominance signal from filter 10), is applied to subtraction stage 3 for generating an output luminance signal Y. In units 4 and 5 controllable switches K1 and K2 are provided by which the respective chrominance signal path (comb filtered or band pass filtered) is selected. The positions of these switches are controlled by an output signal from a signal evaluation circuit contained in unit 6 whereby the phases of signals S1, S2 and S3 associated with one line (1H) delay circuits 1 and 2 are evaluated to produce the switching control signal.

Figure 1B:
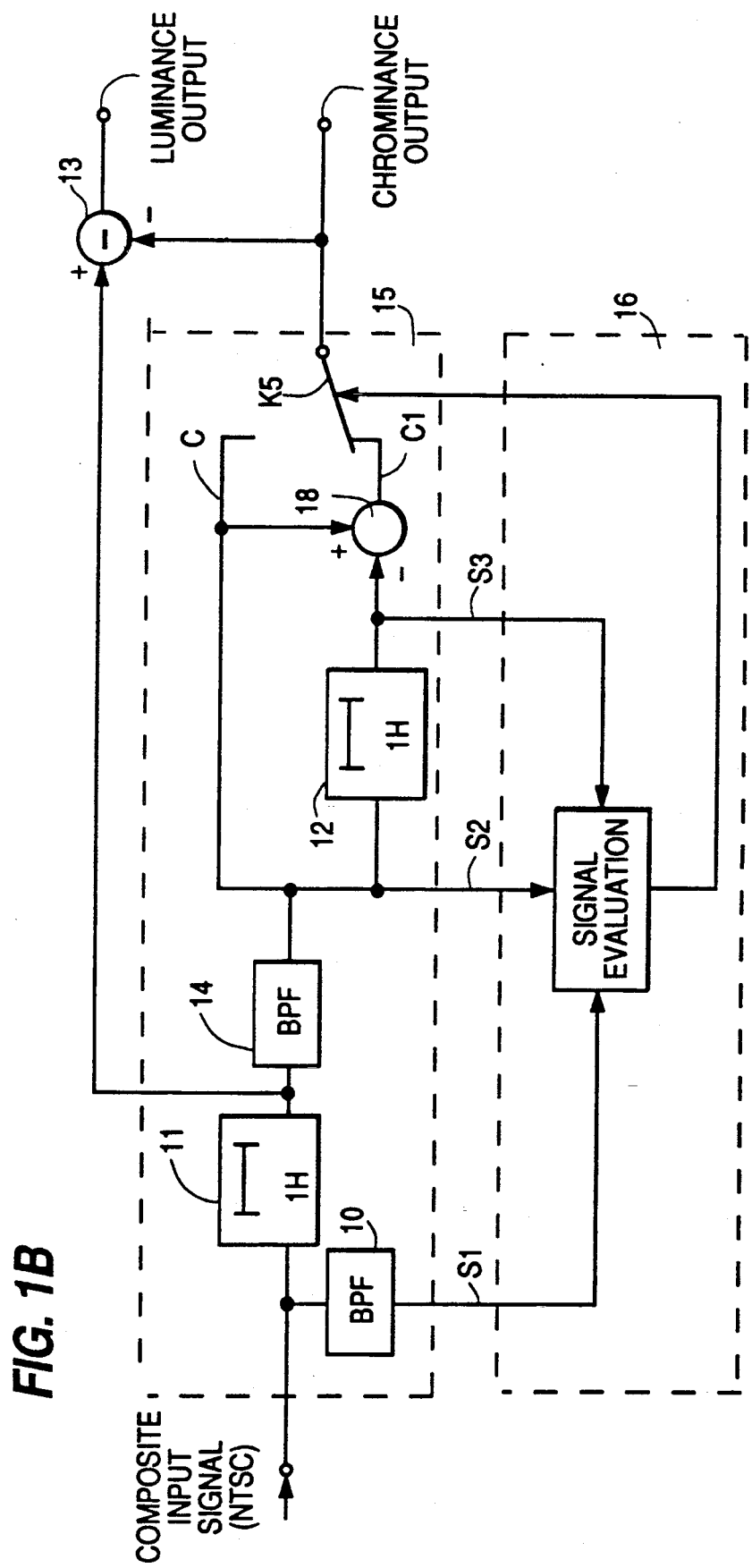
FIG. 1B is a block diagram of an adaptive comb filter according to the present invention for processing a television signal according to NTSC standards.

In FIG. 1B, a composite NTSC input signal applied to the input of a unit 15 is fed to a non-inverting (+) input of a subtraction stage 13 via a broad band one-line (1H) delay circuit 11. Comb filtered chrominance signal C1 occurs by means of a second, narrow band one-line (1H) delay circuit 12 in connection with subtraction stage 18. Delay circuit 12 is coupled to an inverting input (−) of subtraction stage 18 and, with a preceding band pass filter 14 with an output coupled to a non-inverting (+) input of a stage 18, is coupled in series with first delay circuit 11. Delay circuit 11 is not required as such for the NTSC comb filter but is used here in order to attain an undelayed signal S1 in a manner analogous to that shown in FIG. 1A. Signal S1 is derived from the input signal by means of a bandpass filter 10. Signal S1 can be a color subcarrier signal or a band pass filtered luminance signal. Signal S1 is supplied to an evaluation circuit contained in a unit 16 (corresponding to unit 6 of FIG. 1A) for comparing undelayed signal S1 with 1H delayed signal S2 and 2H delayed signal S3. Evaluation circuit 16 produces an output switching control signal to a switch K5 in unit 15 such that switch K5 supplies subtracter 13 with that one of chrominance signals C (bandpass filtered) or C1 (comb filtered) which is more suitable for generating luminance signal Y.

Figure 2:
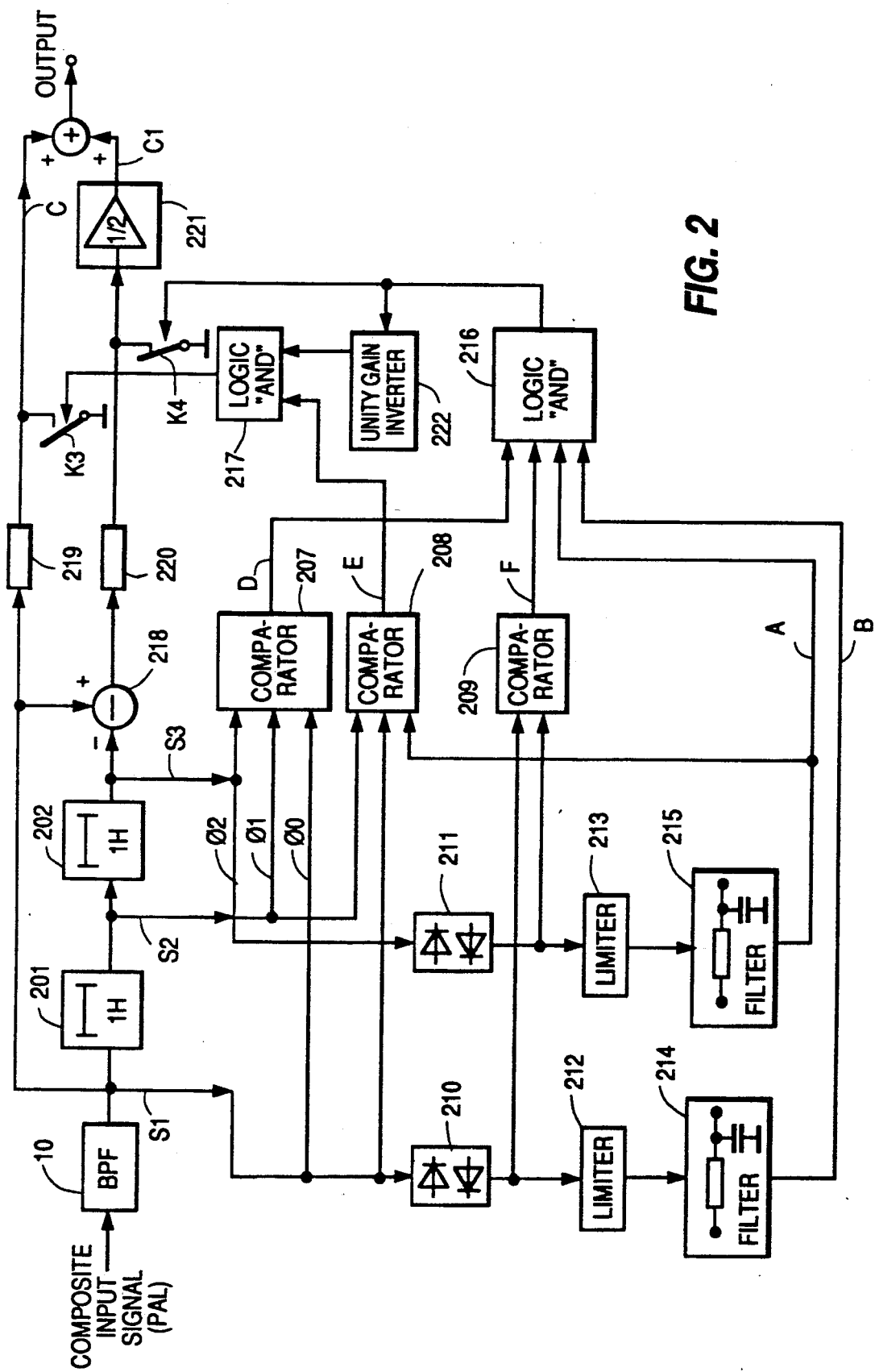
FIGS. 2 and 3 show additional details of apparatus according to the present invention for processing PAL and NTSC-type signals, respectively.

FIG. 2 shows details of the PAL signal evaluation circuit of FIG. 1A including units 4, 5 and 6. Switching signals A, B, D and F are generated in accordance with predetermined criteria, and are fed to inputs of a logic "AND" circuit 216. A further "AND" circuit 217 receives an output signal from a unity gain inverter 222 (an inverted output signal of circuit 216), and a switching signal E generated by comparator 208. Switching of chrominance signal paths is caused by switches K3 and K4 which are respectively controlled by output signals from "AND" circuits 217 and 216. The switches exhibit open and closed positions in response to control signals with high and low logic levels respectively.

Unwanted signal artifacts or disturbances produced by prior art comb filters are reduced or eliminated by the disclosed adaptive apparatus which, using signal evaluation circuits which recognize vertical signal transitions, switches over with every one of such transitions from comb filtered signal C1 to band pass filtered signal C or, if applicable, inhibits the chrominance signal. The comb filtered chrominance signal is taken from the output of subtraction stage 218 which receives as inputs a band pass filtered chrominance signal from filter 200 and a 2H delayed chrominance signal from units 201 and 201. Resistors 219 and 220 serve as de-coupling resistors, and an amplifier 221 with a gain of 0.5 provides amplitude equalization.

The switching criteria associated with the operation of the apparatus of FIG. 2 is as follows.

Comb filtering is enabled for producing comb filtered chrominance signal C1 if a chrominance signal or a high frequency luminance signal appears as signal S3 at the output of the 2H delay network (i.e., at the output of delay 202). For this condition switching signal A exhibits a high logic level. Switching signal A is derived from signal S3 by full-wave rectifying signal S3 in unit 211, then providing the output signal from unit 211 to an amplifier/limiter 213. A filter 215 with a very short time constant filters the output signal from unit 213 to produce signal A.

Comb filtering is disabled when switching signal B exhibits a low logic level. This occurs when a chrominance signal or a high frequency luminance signal are absent at the output of bandpass filter 10 (signal S1). Switching signal B is derived from signal S1 by full wave rectifying signal S1 in unit 210, then providing the output signal from unit 210 to an amplifier-limiter 212. A filter 214 with a very short time constant filters the output signal from unit 212 to produce signal B.

The apparatus of FIG. 2 produces bandpass filtered chrominance signal C rather than comb filtered chrominance signal C1 when the chrominance signal exhibits color transitions in the vertical direction. For this condition switching signal F from a comparator 209 exhibits a low logic level. The phases of signals S1 and S3 at the outputs of rectifier units 210 and 211 are compared in unit 209 to produce switching signal F. A comparison of the phases of signals S1 and S3 directly at the outputs of units 200 and 202 would require that one signal be inverted due to a one-quarter line offset. However, the comb filter would be disabled continuously in the presence of high frequency luminance signals.

A 180 degree color transition also requires that the apparatus of FIG. 2 produce bandpass filtered chrominance signal C rather than comb filtered chrominance signal C1 at the output. A comparator 207 produces a switching signal D with a low logic level for this condition. Comparator 207 responds to phase $\phi 0$ of undelayed signal S1, to phase $\phi 1$ of 1H delayed signal S2, and to phase $\phi 2$ of 2H delayed signal S3. This arrangement allows signal D to indicate the presence of a 180 degree color transition depending upon the nature of the phase difference or phase coincidence of signals S1, S2 and S3. The use of two 1H delay circuits 201, 202 permits the phase of one-line delayed signal S2 to be determined. If a phase difference is sensed from one of the circuits and if at the same time a phase coincidence is sensed from both circuits, it can be deduced that a 180 degree color transition has occurred.

The chrominance signal output of the apparatus of FIG. 2 is inhibited completely in the presence of a high frequency luminance signal transient. This condition is indicated by a switching signal E from a comparator 208 exhibiting a low logic level. Unit 208 responds to undelayed signal S1, to 1H delayed signal S2 and to switching signal A from filter 215. The presence of a luminance signal can be recognized, at the earliest, after one horizontal line (1H) by means of unit 208, indicating that one line is subject to exhibiting a disturbance. Subsequently, with equal signals S1 and S2 preceding and following 1H delay unit 201, the chrominance output signal from the apparatus of FIG. 2 is inhibited if, at the same time, switching signal A indicates that no chrominance signal is present.

With regard to the operation of unit 207 for the case of a 180 degree color change, switching control signal D exhibits a low logic level when signal phases $\phi 0$ and $\phi 1$ are unequal (or signal phases $\phi 1$ and $\phi 2$ are unequal) and signal phases $\phi 0$ and $\phi 2$ are equal. Switching signal D otherwise exhibits a high logic level.

With regard to the operation of unit 208 for the case of a high frequency luminance signal transient, switching control signal E exhibits a low logic level when signal phases $\phi 0$ and $\phi 1$ are equal and switching control signal A exhibits a low logic level. Signal E otherwise exhibits a high logic level.

With regard to the operation of unit 209 for the case of a color transition in the vertical direction, switching control signal F exhibits a high logic level when signal phases $\phi 2$ and $\phi 0$ are equal. Otherwise, signal F exhibits a low logic level.

Figure 3:
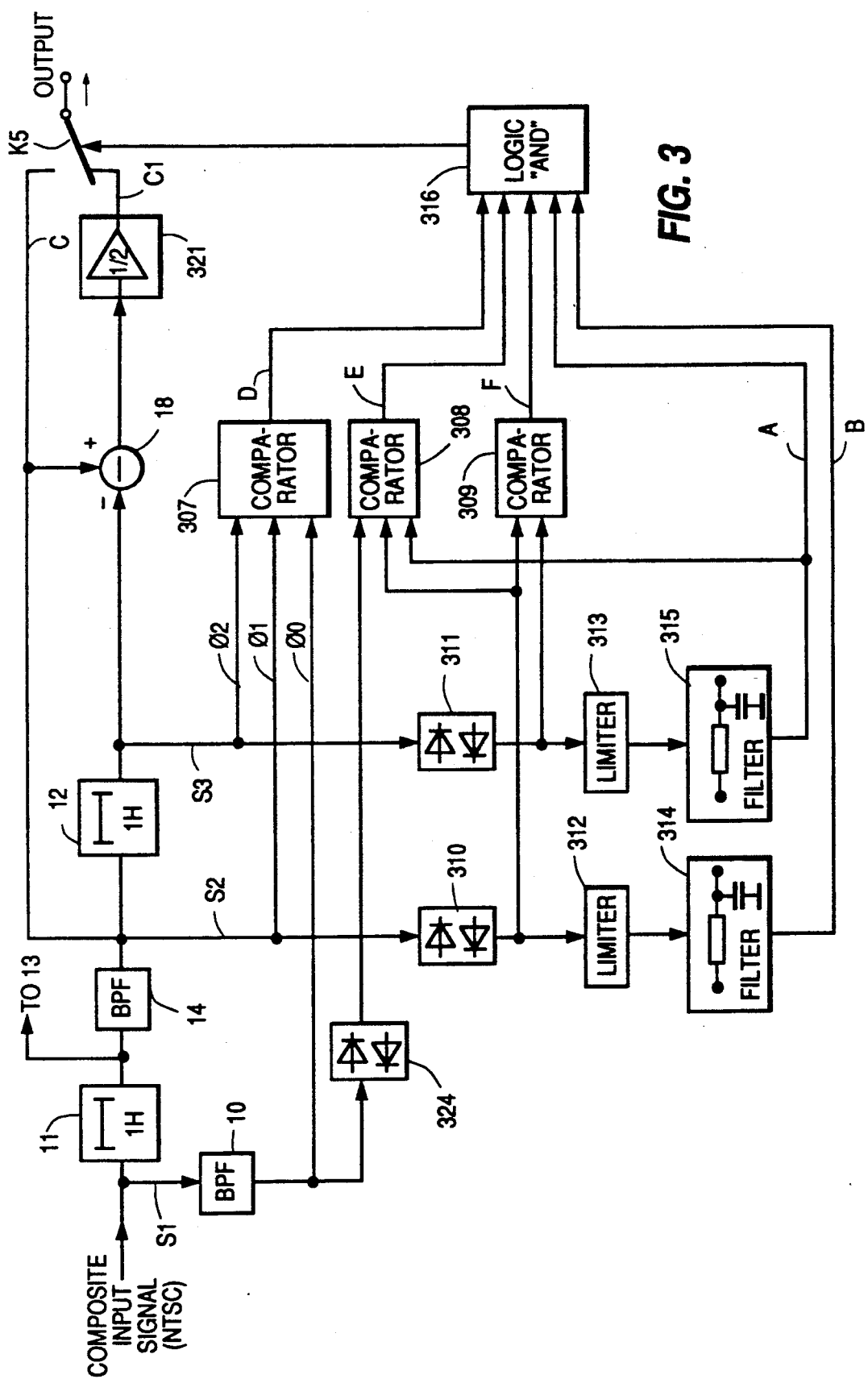

FIG. 3 shows details of the NTSC signal evaluation circuit of FIG. 1B including units 15 and 16. Common elements are designated by the same reference number. Switching signals A, B, C, D and F are generated in accordance with predetermined criteria, and are fed to inputs of a logic "AND" circuit 316. Switching of chrominance signal paths is effected by switch K5 which is controlled by the output signal of "AND" circuit 316. Switch K5 is in the lower position shown for coupling comb filtered signal C1 to the output terminal in response to a high logic level control signal from circuit 316, and is in the upper position in response to a low logic level signal for coupling bandpass filtered chrominance signal C to the output terminal.

Unwanted signal disturbances produced by prior art comb filters are reduced or eliminated by the disclosed adaptive apparatus which, using signal evaluation circuits that recognize vertical signal transitions, switches over with such transitions from an output comb filtered signal C1 to an output band pass filtered signal C. The comb filtered chrominance signal C1 is taken from the output of subtraction stage 18 which receives as inputs the undelayed chrominance signal from bandpass filter 14 and the delayed chrominance signal from the output of 1H delay unit 12. An amplifier 321 with a gain of 0.5 provides amplitude equalization. Many of the remaining elements of FIG. 3 are functionally similar to elements of FIG. 2.

The switching criteria associated with the operation of the apparatus of FIG. 3 is as follows.

Switch K5 conveys comb filtered chrominance signal C1 to the output terminal if a high frequency chrominance signal or luminance signal (Y) is present. In such case switching signal A exhibits a high logic level and/or switching signal B exhibits a high logic level. Switching signal A is obtained by full-wave rectifying signal S3 in a unit 311, limiting the rectified signal by means of an amplifier/limiter 313, and filtering the amplitude limited from unit 313 via a filter 315 having a very short time constant.

Switching control signal B can be similarly obtained from signal S2 by means of a full-wave rectifier 310, an amplifier/limiter 312, and a filter 314 with a very short time constant.

When color transitions in the vertical direction occur (color phase change), bandpass filtered signal C rather than comb filtered chrominance signal C1 is conveyed to the output terminal by switch K5. In this case switching control signal F exhibits a low logic level. If the phases of signals S2 and S3 were directly compared, one signal would have to be inverted due to a line offset. However, the comb filter would be inhibited continuously in the presence of high frequency luminance signals. Thus in the apparatus of FIG. 3 signals S2 and S3 are full-wave rectified by units 310 and 311 respectively before being phase compared by unit 309, which produces switching signal F.

A 180 degree color transient condition also requires that switch K5 conveys the bandpass filtered chrominance signal rather than the comb filtered chrominance signal to the output terminal. For this condition a switching control signal D produced by a comparator 307 exhibits a low logic level. Comparator 307, which resembles comparator 207 in FIG. 2, responds to phase $\phi 0$ of undelayed signal S1 from the output of chrominance bandpass filter 10, to phase $\phi 1$ of 1H delayed signal S2, and to phase $\phi 2$ of 2H delayed signal S3. As in the case of the FIG. 2 apparatus, the series arrangement of 1H delay elements 11 and 12 permits the recognition of the phase of signal S2 as delayed by one line, as well as the phase of signal S3 as delayed by two lines. A 180 degree color phase transient condition is indicated when a phase difference is determined via delay element 11 and, at the same time, via both delay elements 11 and 12.

A high frequency luminance signal transient, i.e., a rapid signal transition from a low frequency to a high frequency luminance signal, also requires that bandpass filtered chrominance signal C be conveyed to the output terminal instead of comb filtered chrominance signal C1. For this condition switching control signal E produced by a comparator 308 exhibits a low logic level. Comparator 308 responds to undelayed signal S1 from the output of bandpass filter 10 after being full-wave rectified by a unit 324, to 1H delayed signal S2 after full-wave rectification by a unit 310, and to 2H delayed signal S3 after full-wave rectification by unit 313. Switching signal E exhibits a low logic level when undelayed signal S1 and 1H delayed signal S2 are equal and at the same time switching signal A exhibits a low logic level.

With regard to the operation of unit 307 for the case of a 180 degree color transient condition, switching control signal D exhibits a low logic level when signal phases $\phi 0$ and $\phi 1$ are unequal and at the same time signal phases $\phi 0$ and $\phi 2$ are unequal and/or signal phases $\phi 1$ and $\phi 2$ are equal. Signal D otherwise exhibits a high logic level.

With regard to the operation of unit 308 for a signal transient to a high frequency luminance signal, switching control signal E exhibits a low logic level when signal phase $\phi 0$ equals signal phase $\phi 1$ and switching control signal E exhibits a low logic level. Signal E otherwise exhibits a high logic level.

With regard to the operation of unit 309 for a color transition in the vertical direction, switching control signal F exhibits a low logic level when signal phases $\phi 1$ and $\phi 2$ are unequal. Signal F otherwise exhibits a high logic level.

The circuit arrangements of FIGS. 2 and 3 are illustrative examples; other circuit configurations are possible. The circuit arrangements can be realized in analog or digital form, and can be fabricated as an integrated circuit.

We claim:

1. An adaptive comb filter for separating luminance and chrominance components of a composite television signal, comprising:
   comb filter first means responsive to said composite television signal for providing a separated comb filtered chrominance component, said first means comprising signal delay means including first and second series delay elements and having an input terminal coupled to an input of said first delay element, an output terminal coupled to an output of said second delay element, and an intermediate terminal coupling an output of said first delay element to an input of said second delay element;
   second means responsive to said composite television signal for providing a separated chrominance component;
   signal subtraction means having a first input for receiving said composite television signal and a second input for receiving a chrominance component to be subtracted from said composite television signal to produce a separated luminance component;
   phase comparator means having plural inputs coupled to said signal delay means for developing a control signal having first and second states in accordance with prescribed mutual phase relationships of signals applied to said plural inputs of said phase comparator means from said signal delay means; and
   switch means responsive to said control signal for selectively conveying either said separated chrominance component from said first means or said separated chrominance component from said second means to second input of said signal subtraction means as a function of said control signal states.

2. Apparatus according to claim 1, wherein
   said composite television signal is a PAL-type signal; and
   said switch means conveys said comb filtered chrominance component from said first means to said signal subtraction means when said control signal is indicative of the signal appearing at said output terminal of said delay means being a chrominance signal or a high frequency luminance signal.

3. Apparatus according to claim 1, wherein said switch means conveys said separated chrominance component from said second means to said subtraction means when said control signal indicates the presence of color transitions in the vertical direction.

4. Apparatus according to claim 1, wherein said composite television signal is a PAL-type signal; and
said switch means conveys neither of said chrominance components from said first and second means respectively to said subtraction means when said control signal is indicative of a signal change to a high frequency luminance signal within successive image lines.

5. Apparatus according to claim 1, wherein said composite television signal is an NTSC-type television signal; and
said switch means conveys said comb filtered chrominance component from said first means to said subtraction means when said control signal is indicative of signals appearing at said intermediate and output terminals of said delay means being a high frequency luminance component or a chrominance component.

6. An adaptive comb filter for separating luminance and chrominance components of a composite television signal, comprising:
comb filter first means responsive to said composite television signal for providing a separated comb filtered chrominance component, said first means including plural signal delay means comprising first and second cascaded 1H delay elements coupled between a source of said composite television signal and said second input of said subtracting means;
bandpass filter second means responsive to said composite television signal for providing a separated chrominance component;
means for subtracting a chrominance signal applied to a first input thereof from said composite television signal applied to a second input thereof to produce a separated luminance component;
phase comparator means having plural inputs coupled to said first means including said plural delay elements for developing a control signal representative of a predetermined mutual phase relationship of signals applied to said plural inputs; and
switch means responsive to said control signal for selectively conveying either said separated chrominance component from said first means or said separated chrominance component from said second means to said first input of said subtracting means as a function of the condition of said control signal.

7. Apparatus according to claim 6, wherein said switch means conveys said separated comb filtered chrominance component to said subtracting means when said control signal is representative of chrominance or high frequency luminance information present in a 2H delayed signal from said signal delay means.

8. Apparatus according to claim 6, wherein said composite television signal is an NTSC-type signal; and
said switch means conveys said separated chrominance component from said second means to said subtracting means when said control signal is representative of a transistion from low frequency luminance information to high frequency luminance information between successive image lines.

9. Apparatus according to claim 6, wherein said switch means conveys said separated chrominance component from said second filter means to said subtraction means when said control signal is representative of the absence of chrominance or high frequency luminance information in a 2H delayed signal from said signal delay means.

10. Apparatus according to claim 6, wherein said switch means conveys said separated chrominance component from said second filter means to said subtraction means when said control signal is representative of color transistions in a vertical direction.

11. Apparatus according to claim 6, wherein said switch means conveys said separated chrominance component from said second filter means to said subtraction means when said control signal is representative of a 180° color phase change in response to the relative phases of said composite television signal, a 1H delayed signal produced by said delay means, and a 2H delayed signal produced by said delay means.

* * * * *